(12) United States Patent
Barker et al.

(10) Patent No.: US 7,399,016 B2
(45) Date of Patent: Jul. 15, 2008

(54) COOKING UTENSIL

(76) Inventors: William E. Barker, 2114 Prospect, Chelan, WA (US) 98816; Donald W. Hensley, 258 Boetzkes, Manson, WA (US) 98831

( * ) Notice: Subject to any disclaimer, the term of this patent is extended or adjusted under 35 U.S.C. 154(b) by 450 days.

(21) Appl. No.: 11/023,718

(22) Filed: Dec. 28, 2004

(65) Prior Publication Data

US 2006/0137676 A1     Jun. 29, 2006

(51) Int. Cl.
*A47J 43/28* (2006.01)
*F24B 15/00* (2006.01)
(52) U.S. Cl. .............................. 294/7; 294/10
(58) Field of Classification Search ............... 294/7, 294/100, 1, 10, 12; 126/14, 25 R; 30/322–324, 30/327

See application file for complete search history.

(56) References Cited

U.S. PATENT DOCUMENTS

| | | | | | |
|---|---|---|---|---|---|
| 67,435 | A | * | 8/1867 | Johnson | 126/14 |
| 1,723,507 | A | * | 8/1929 | Haertter | 294/7 |
| 3,212,779 | A | * | 10/1965 | First | 99/352 |
| 4,034,662 | A | | 7/1977 | McLane | |
| 4,040,343 | A | | 8/1977 | De Lucchi | |
| 4,649,599 | A | | 3/1987 | Beller | |
| 6,145,204 | A | * | 11/2000 | Cash | 30/322 |
| 2004/0164569 | A1 | * | 8/2004 | Grundler | 294/7 |

* cited by examiner

*Primary Examiner*—Dean J Kramer
(74) *Attorney, Agent, or Firm*—Wells St. John P.S.

(57) ABSTRACT

A cooking utensil for use with a cooking appliance having a hingedly mounted cover includes a food engaging portion; and a shaft mounted on the food engaging portion and which supports the cover in a given spaced orientation relative to the cooking appliance.

28 Claims, 4 Drawing Sheets

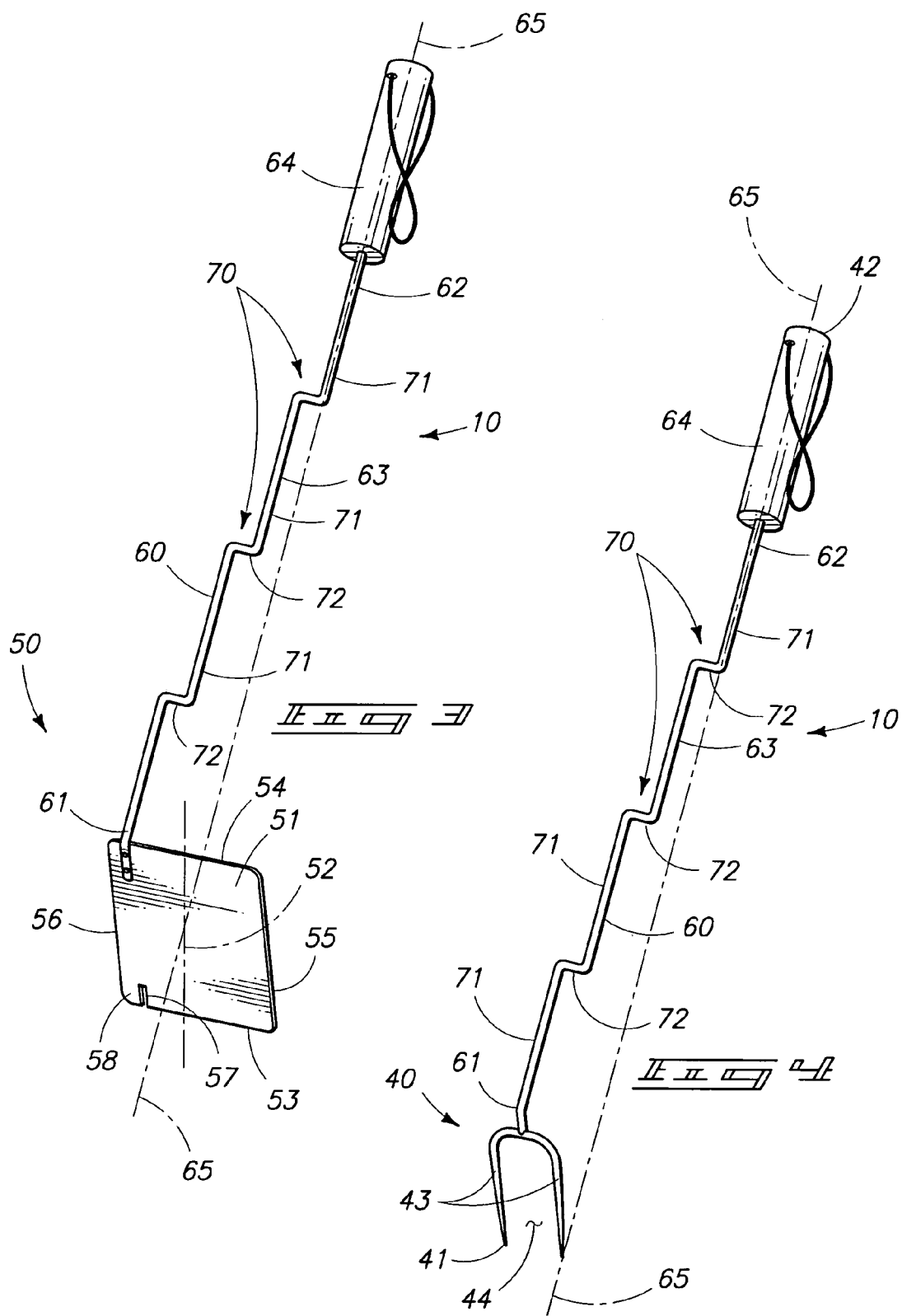

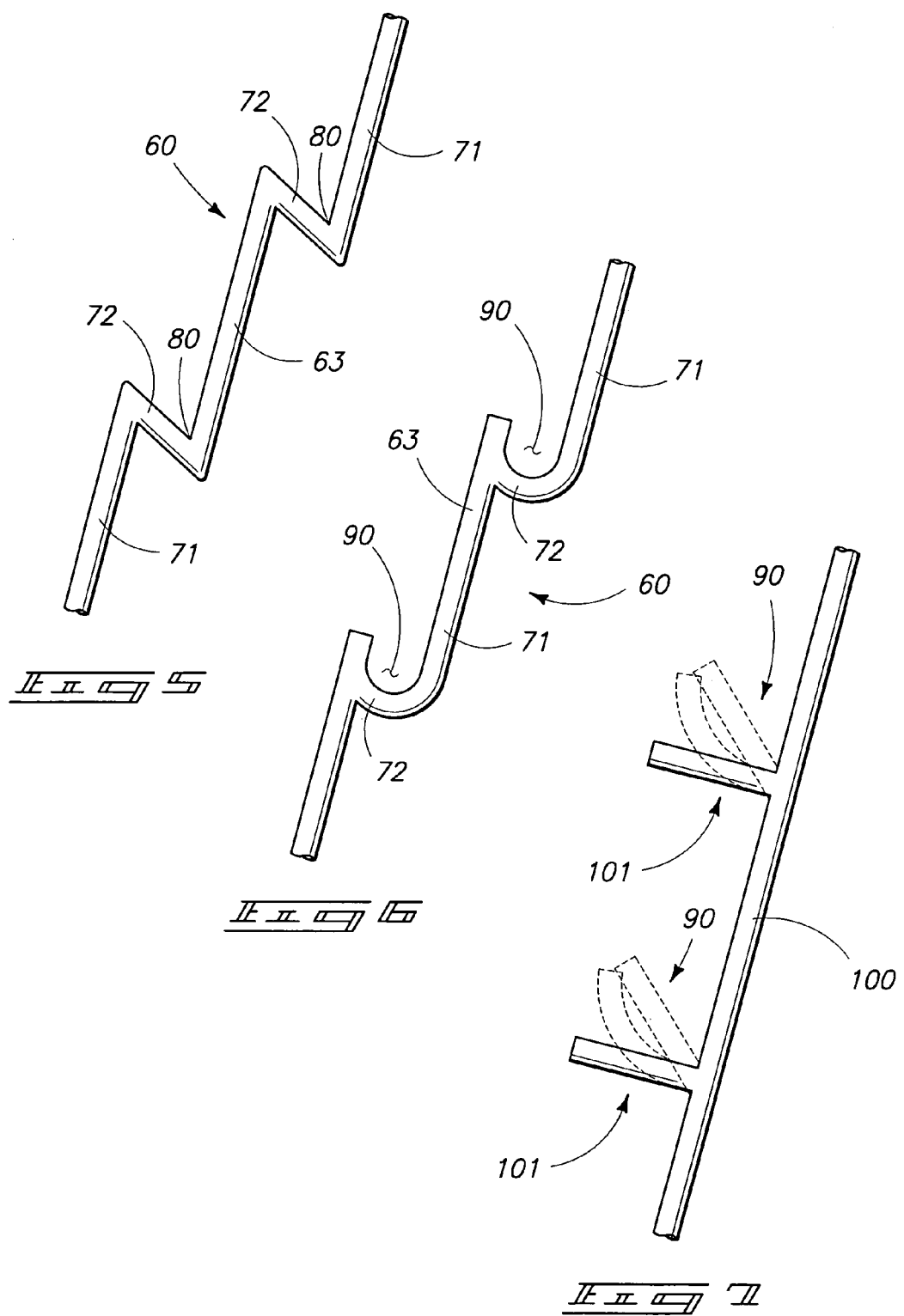

COOKING UTENSIL

TECHNICAL FIELD

The present invention relates to a cooking utensil, and more specifically to a cooking utensil which is operable to support the cover of a cooking appliance in spaced relation relative to a cooking surface.

BACKGROUND OF THE INVENTION

Various outdoor cooking appliances such as gas grills, charcoal grills and the like have been designed through the years. As a general matter all of the outdoor cooking appliances have a cooking surface, and typically include a cover which is hingedly or otherwise moveably mounted relative to the cooking surface so that the food being prepared on the cooking surface may be covered during the cooking process. This process of covering the food may achieve several benefits, among them being suppressing any fire that may be generated during the cooking process as may be occasioned by grease drippings and the like engaging the burners, or combustible fuel positioned below the cooking surface, or further, to enhance the flavor of the food as by exposing the food to increasing amounts of smoke as might be generated through the cooking process.

As many know who have used these outside cooking appliances, small fires do erupt in these outdoor grills and cooking appliances due to the presence of highly combustible fat which drips from meats, chops and the like, during the cooking process. If an individual, who is cooking a food product is unaware of this fire, especially if the cover of the cooking appliance is in covering relation relative to the cooking surface, then the food being grilled may be damaged and rendered completely unusable. To address this problem, many cooks often will stand close watch over their cooking appliances and will frequently open the covers to ensure that no fires are taking place that would render the food unusable.

A cooking utensil which is operable to address these and other shortcomings in the prior art practices noted above is the subject matter of the present application.

SUMMARY OF THE INVENTION

A first aspect of the present invention relates to a cooking utensil for use with a cooking appliance having a hingedly mounted cover and which includes a food engaging portion; and a shaft mounted on the food engaging portion and which is operable to support the cover in a given spaced orientation relative to the cooking appliance.

Another aspect of the present invention relates to a cooking utensil for use with a cooking appliance having a cooking surface, and a hingedly mounted cover for selectively covering the cooking surface, the cooking utensil including a shaft having a first, and opposite second end, and wherein the shaft has an intermediate portion located between the first and second ends, and wherein the intermediate portion is defined by a plurality of first and second courses, and wherein the respective first and second courses define individual steps; a food engaging portion mounted on the first end of the shaft, and which further defines a region which cooperates with the cooking appliance; and a handle mounted on the second end of the shaft, and wherein the respective steps of the shaft selectively orient the cover in spaced relation relative to the cooking surface.

Still further, another aspect of the present invention relates to a cooking utensil for use with a cooking appliance and which is defined by a sidewall, and which further has a cooking surface, and a hingedly moveable cover which may be oriented in a first, substantially covering position relative to the cooking surface, and a second substantially unsupported position which allows access to the cooking surface, the cooking utensil including a food engagement portion which defines a channel which mating receives a portion of the sidewall of the cooking appliance; and an elongated shaft having a first end which is mounted on the food engagement portion, and an opposite second end which defines a handle, and wherein the elongated shaft defines a plurality of steps therebetween the first and second ends of the shaft, and wherein the cooking utensil is operable to support the cover of the cooking appliance in a plurality of substantially fixed orientations there between the first and second position of the cover when the food engagement portion engages the sidewall of the cooking appliance, and the cover is disposed in gravitationally rested relation on one of the plurality of steps.

These and other aspects of the present invention will become more evident hereinafter.

BRIEF DESCRIPTION OF THE DRAWINGS

Preferred embodiments of the invention are described below with reference to the following accompanying drawings.

FIG. 1 is a perspective environmental view showing the operation of the

FIG. 3 is a perspective, side elevation view of a first form of the present invention.

FIG. 4 is a perspective, side elevation view of a second form of the present invention.

FIG. 5 is a fragmentary, perspective view of one alternative form of a shaft which may be employed in the present invention.

FIG. 6 is a fragmentary, perspective view of yet a further alternative form of a shaft which may be employed in the present invention.

FIG. 7 is a fragmentary, perspective view of still another alternative form of a shaft which may be employed in the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
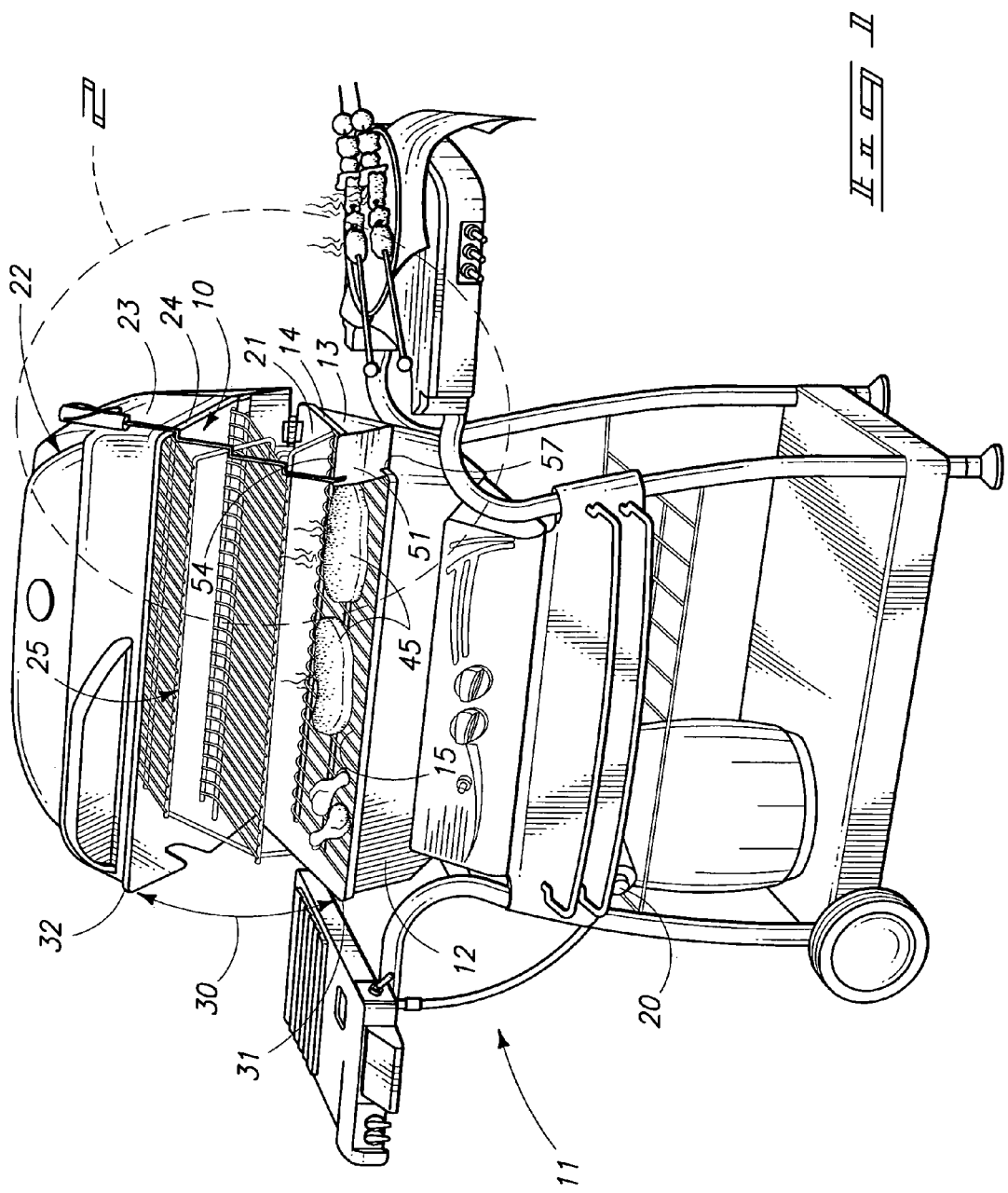

A cooking utensil which embraces the teachings of the present invention is generally indicated by the numeral 10 in FIG. 1 and following. As seen in FIG. 1, the cooking utensil 10 is useful with a cooking appliance which is generally indicated by the numeral 11. The cooking appliance is of traditional design having a main body 12 which is defined by a sidewall 13. The sidewall 13 defines an upwardly facing and circumscribing peripheral edge 14. The sidewall supports a cooking surface 15 which is typically a grate, grill or the like and which is positioned therebetween the circumscribing peripheral edges 14 as defined by the sidewall 13. As seen by reference to FIG. 2, a gap 16 is defined therebetween the cooking surface 15 and the circumscribing peripheral edge 14. Still referring to FIG. 2, the cooking surface 15 is defined by a forward edge 20 and a rearward edge 21. As seen in the drawings, the cooking appliance 12 has a hingedly moveable cover which is generally indicated by the numeral 22. The cover is defined by a substantially continuous sidewall 23 which has a peripheral edge generally indicated by the numeral 24. The peripheral edge defines an opening which leads to a cavity 25. As noted above, the cover 22 includes a hinge 26 which is positioned at given locations along the peripheral edge 24 and which hingedly mounts and moveably affixes the cover 22 to the underlying sidewall 13 of the cooking appliance 11. As seen by reference to FIG. 1, the hingedly moveable cover 23 is moveable along a course of travel 30 from a first substantially covering position relative to the cooking surface 15, and a second substantially unsupported position which allows access to the cooking surface 15. Typically, the hinge 26 defines this course of travel and will hold the cover 22 in the second unsupported and uncovered position 32 when the cover is moved to a position where it is substantially vertically oriented relative to the cooking surface 15.

The cooking utensil of the present invention 10 includes, in one form, a food engaging portion and which is represented by a fork, that is generally indicated by the numeral 40. As seen in FIG. 4, the fork has a first end 41, and an opposite second end 42. The fork is defined by a plurality of tines 43 which are disposed in spaced relation one relative to the other. A gap or channel 44 is defined between the tines. The fork is operable to, on the one hand, engage a food product such as a steak or a chop 45 which are being cooked on the cooking appliance 11. As best appreciated by a study of FIG. 2, the gap or channel 44 of the fork is further operable to receive, at least in part, a portion of the cooking appliance 11, and more specifically a portion of the sidewall 13 therein. In this orientation, the respective tines straddle the opposite sides of the sidewall 13. Once the sidewall 13 is received in the gap or channel 44, the fork frictionally engages the sidewall for the purposes which will be described in greater detail hereinafter.

Figure 2:
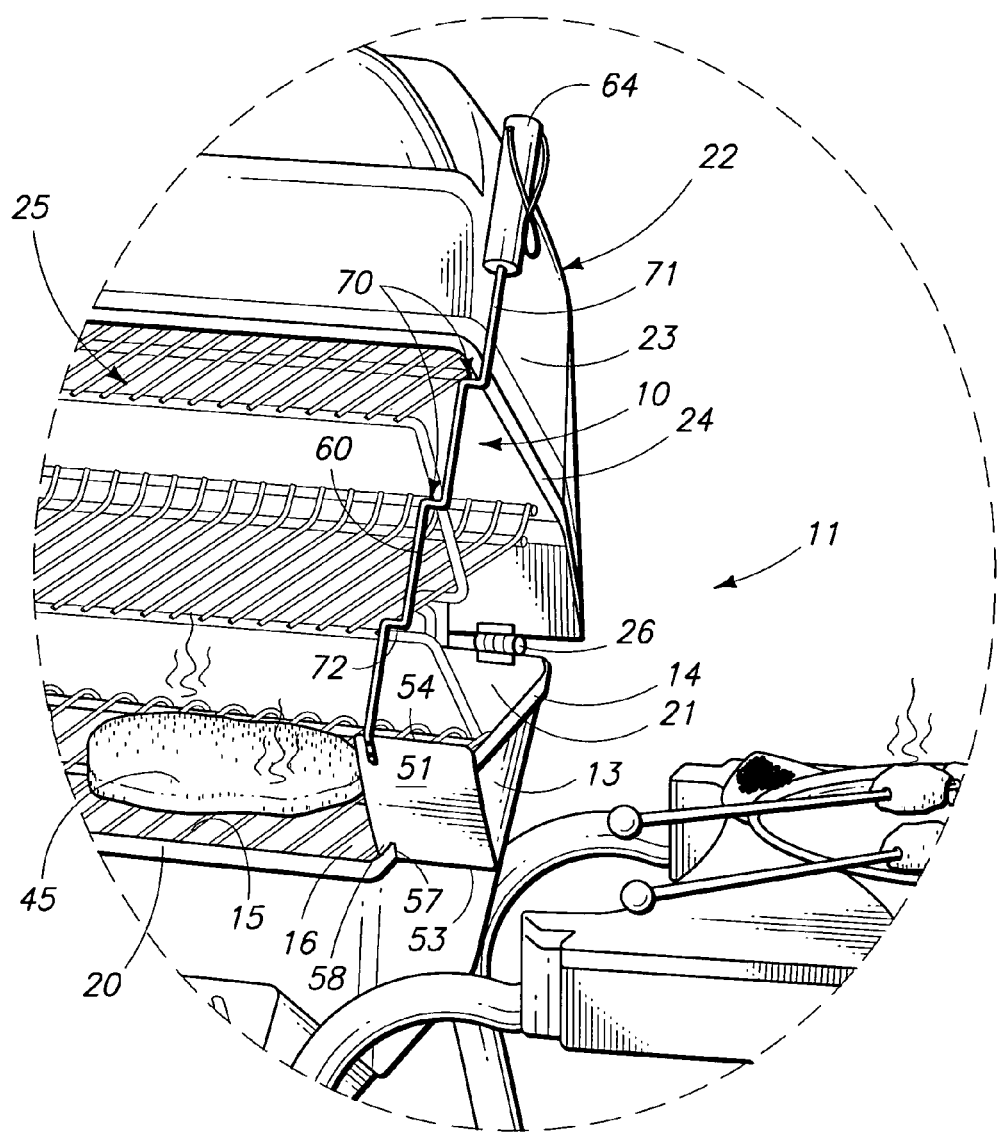
FIG. 2 is an enlarged perspective view showing the operation of the present invention.

The food engaging portion of the cooking utensil 10 of the present invention further includes, in another form a spatula, which is generally indicated by the numeral 50. The spatula has a main body 51 which is typically fabricated from a flexible metal or other heat resistant material. The main body, as seen in the drawings, is generally rectangular, but for purposes of the present patent application it should be understood that shapes other than the rectangular form, as illustrated, will work with equal degrees of success. The main body 51 has a line of reference, which is generally indicated by the numeral 52. As a general matter, the main body 51 has a forward edge 53, and an opposite trailing edge 54. Still further, the main body is defined by first and second side edges 55 and 56, respectively, and which are disposed in predetermined spaced relation one relative to the other. As seen in FIGS. 2 and 3, a narrow elongated channel 57 is formed in the forward edge 53 and extends generally in the direction of the second or trailing edge 54. The channel 57 is formed in a location which is in close proximity to one of the first or second side edges 55 and 56, respectively. As seen in FIGS. 1 and 2, the channel 57 is operable to receive a portion of the cooking utensil, and more specifically a portion or region of the sidewall 13, therein. When received in the channel 57, the main body 51 is operable to frictionally engage the circumscribing peripheral edge 14 for the purposes which will be described below. As seen in FIG. 2, a portion 58 of the main body 51 and which is defined therebetween the elongated channel 57, and one of the side edges 55 or 56, respectively is received in the gap 16 which defined therebetween the cooking surface 15 and the circumscribing peripheral edge 14.

Referring now to FIGS. 3 and 4, it will be understood that each of the forms of the cooking utensil 10, as seen in the drawings, includes a shaft portion which is generally indicated by the numeral 60. The shaft portion has a first end 61; an opposite second end 62; and an intermediate portion 63 which is defined therebetween. As seen by reference to FIGS. 3 and 4, a heat resistant handle 64 is mounted on the second end 62, and a line of reference 65 extends through the heat resistant handle 64 as shown. The food engaging portion, that being either, on the one hand, the fork 40, or the spatula 50, are located either along, or is positioned near, this line of reference 65. The first end of the shaft 61 is mounted on the food engaging portion as represented by the spatula 50 at a location which is disposed in laterally offset relation relative to the longitudinal line of reference 52. As seen in FIG. 3, the first end 61 is affixed near one of the first or second side edges 55 or 56. As illustrated, the first end 61 of the shaft portion 60 is generally aligned with the channel 57 as defined by the forward edge 53 of the main body 51, or in the alternative, the gap or channel 44 as defined between the tines of the fork 40.

As seen in FIGS. 3 and 4, each form of the cooking utensil 10 as described above has an intermediate portion 63 located therebetween the first and second ends 61 and 62, and which further is defined by a plurality of steps 70. The plurality of steps are individually defined by a plurality of first courses 71. The respective first courses are oriented in one form of the invention in substantially parallel, spaced, and laterally offset relation relative to the line of reference 65 which extends through the handle 64. The length dimension of these individual first courses 71 may vary thereby positioning or locating the individual steps 70 in either equal and/or unequal locations along the intermediate portion 63 of the shaft 60. Still further, the individual steps 70 include a plurality of second courses 72 which are joined to the individual first courses and which are oriented in substantially transverse relation relative to the line of reference 65 which extends through the handle 64. In this regard, the second courses 72 have a length dimension, which is greater than the thickness dimension of the sidewall 23 which forms the cover 22. Again, the second courses are disposed in substantially parallel spaced relation one relative to the other, and are further located in increasingly lateral offset, and substantially transverse relation relative to the line of reference which extends through the handle when the second courses are measured or viewed from the second end of the shaft 60.

In another possible form of the invention, as seen in FIG. 5, the second courses 72 may be disposed in a selected angular orientation relative to the adjoining first portion 71 to define an angled pocket 80 which would receive or otherwise support the sidewall 23 of the cover 22. This angular relationship would typically be less than about 90 degrees relative to the adjoining first course 71. Still further, and in yet another possible form of the invention as seen in FIG. 6, the shaft 60 could define a plurality of spaced U-shaped pockets 90 instead of the rather sharply angled steps 70. Moreover, in another form of the invention as seen in FIG. 7, the shaft 60 may be replaced with a substantially linear shaft 100, and which has spaced along its length steps 101 which can be substantially perpendicular to the shaft 100, angled or curved as seen in that view, to form the respective pockets 90. All these variations are viewed as being within the scope of the present invention.

As seen by reference to FIGS. 1 and 2, the shaft 60 which is mounted on the food engaging portion either 40 or 50 supports the cover 22 in a given spaced orientation relative to the cooking appliance 11, and more specifically therebetween the first covering position 31, and the second unsupported, and uncovered position generally indicated by the numeral 32. As seen, the plurality of steps 70 are operable to selectively orient the cover 22 in spaced relation relative to the cooking surface 15, thereby allowing a cook, for example, to continually view the food product 45 being prepared on the cooking surface 15 while simultaneously positioning the cover 22 in an orientation which achieves many of the same advantages that would be achieved in the event that the cover 22 was placed in the first covering position 31 and which prohibited the viewing of the food product 45 being prepared.

OPERATION

The operation of the described embodiments of the present invention are believed to be readily apparent and are briefly summarized at this point.

In one of its broadest aspects, a cooking utensil 10 for use with a cooking appliance 11 having a hingedly mounted cover 22, is shown, and which includes a food engaging portion, here shown as a fork 40, or a spatula 50; and a shaft 60 mounted on the food engaging portion, and which supports the cover 22 in a given spaced orientation relative to the cooking appliance 11. In the arrangement as seen, the cooking appliance 11 has a cooking surface 15, which defines, at least in part, a portion of the cooking appliance. The hingedly mounted cover 22 is operable to be moved from a first position 31, wherein the cover is positioned in covering relation relative to the cooking surface 15, to a second position 32, which exposes, at least in part, a portion of the cooking surface 15. As seen in the drawings, the shaft 60 engages the cover 22 so as to position the cover therebetween the first and second positions. As illustrated in the drawings, the food engaging portion, whether it be a fork 40, or a spatula 50, engages, at least in part, a region of the sidewall 13 of the cooking appliance 11. In the several forms of the invention 10 as shown, the shaft 60 defines at least one step 70, and the cover 22 of the cooking appliance 11 is disposed in gravitationally rested relation on the at least one step 70 when oriented therebetween the first and second positions 31 and 32, respectively. As illustrated in the drawings, the shaft 60 may define a plurality of steps which are equally and/or unequally spaced one relative to the other. The cooking utensil 10 further comprises a heat insulative handle 64 which is mounted on the second end 62 of the shaft 60. In each of the forms of the invention as shown, the food engaging portion, which may comprise a fork, or a spatula, defines a channel 44 or 57, respectively, and which is operable to matingly cooperate with the sidewall 13 of the cooking appliance 11. When received therein, the shaft 60 is oriented in a position wherein the cover 22 may rest in gravitationally rested relation on one of plurality of steps 70.

More specifically, a cooking utensil 10 for use with a cooking appliance 11 having a cooking surface 15, and a hingedly mounted cover 22 for selectively covering the cooking surface 15 is shown in FIGS. 2-4. In this regard, the cooking utensil 10 includes a shaft 60 having first and second ends 61 and 62, and wherein the shaft has an intermediate portion 63 located therebetween the first and second ends. The intermediate portion is defined by a plurality of first and second courses 71 and 72. The first and second courses individually define a plurality of steps 70. A food engaging portion 40 or 50 is provided and which is mounted on the first end 61 of the shaft 60 and which further defines a region 44 or 57 which cooperates with the cooking appliance. Still further, the cooking utensil 10 includes a handle 64 which is mounted on the second end 62 of the shaft 60. The respective steps of the shaft are operable to selectively orient the cover 22 in spaced relation relative to the cooking surface 15. As seen in the drawings, and in one of the forms of the invention, the heat resistant handle 64 is oriented along a given line of reference 65, and the plurality of first courses 71 as defined by the intermediate portion 63 of the shaft 60 are oriented in substantially spaced and laterally offset relation relative to the line of reference 65. As seen in the drawings, the plurality of steps 70 are further defined by a plurality of second courses 72 which are individually positioned therebetween the respective first courses 71. The respective second courses are individually oriented in angulated, increasingly spaced relation relative to the line of reference as that is measured from the second end of the shaft 60 in the direction of the first end 61 thereof.

Therefore a cooking utensil 10 of the present invention, as shown is useful with a cooking appliance 11 which is defined by a sidewall 13, and which further has a hingedly moveable cover 22 which may be located in a first, substantially covering position 31 relative to the cooking surface 15, and a second substantially unsupported position 32, which allows access to the cooking surface 15. The cooking utensil 10 of the present invention includes, among other features, a food engagement portion 40 or 50 and which defines a channel 44 or 57 which mating receives a portion of the sidewall 13 of the cooking appliance 11. Still further, the cooking utensil 10 includes an elongated shaft 60 having a first end 61 which is mounted on the food engagement portion, and an opposite second end which defines a handle, and wherein the elongated shaft defines a plurality of steps 70 therebetween the first and second ends of the shaft. The cooking utensil 10 is operable to support the cover 22 of the cooking appliance in a plurality of substantially fixed orientations therebetween the first and second position 31 and 32 of the cover 22 when the food engagement portion engages the sidewall 13 of the cooking appliance 11, and the cover is disposed in gravitationally rested relation on one of the plurality of steps 70 or pockets 80 or 90.

Therefore it will be seen that the present invention provides a convenient means whereby a cook may position the cover of an outside cooking appliance such as a grill or the like in a plurality of orientations relative to a food product being prepared on a cooking surface to avoid many of the shortcomings attendant with the prior art practices which have resulted in overcooked, or charred food products.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A cooking utensil for use with a cooking appliance having a hingedly mounted cover, comprising:
    a food engaging portion which matingly engages a sidewall of a cooking appliance which has a hingedly mounted cover; and
    a shaft mounted on the food engaging portion and which defines at least one step and which supports the cover in a given spaced orientation relative to the cooking appliance when the cooking utensil is not being employed to cook food.

2. A cooking utensil as claimed in claim 1, and wherein the shaft is substantially nonlinear.

3. A cooking utensil as claimed in claim 1, and wherein the shaft is substantially linear.

4. A cooking utensil as claimed in claim 1, and wherein the cooking appliance has a cooking surface, and the sidewall defines, at least in part, a portion of the cooking appliance, and wherein the hingedly mounted cover is operable to be moved from a first position, wherein the cover is located in covering relation relative to the cooking surface, to a second position, wherein the cover is located in an orientation which exposes, at least in part, a portion of the cooking surface, and wherein the shaft engages the cover so as to support the cover therebetween the first and second positions.

5. A cooking utensil as claimed in claim 4, and wherein the food engaging portion engages, at least in part, a region of the sidewall of the cooking appliance.

6. A cooking utensil as claimed in claim 4, and wherein the cover of the cooking appliance is disposed in gravitationally rested relation on the at least one step when oriented therebetween the first and second positions.

7. A cooking utensil as claimed in claim 6, and wherein the shaft defines a plurality of steps.

8. A cooking utensil as claimed in claim 6, and wherein the shaft has a first end which is mounted on the food engaging portion, and an opposite second end, and wherein the cooking utensil further comprises a heat insulative handle which is mounted on the second end of the shaft.

9. A cooking utensil as claimed in claim 6, and wherein the food engaging portion comprises a spatula which has a forward edge, and an opposite trailing edge, and wherein the shaft is mounted on the trailing edge, and wherein the forward edge defines a channel which extends from the forward edge and generally in the direction of the trailing edge, and wherein the sidewall of the cooking appliance is received in the channel when the cooking utensil is supporting the cover of the cooking appliance in the second position.

10. A cooking utensil as claimed in claim 9, and wherein the spatula has a main body with a line of reference, and opposite side edges, and wherein the shaft is mounted on the trailing edge, and disposed in laterally offset relation relative to the line of reference.

11. A cooking utensil as claimed in claim 10, and wherein the channel is positioned adjacent to one of the opposite edges.

12. A cooking utensil as claimed in claim 6, and wherein the food engaging portion comprises a fork which is defined by a plurality of tines, and wherein a gap is defined between the adjacent tines, and wherein the sidewall of the cooking appliance is received in the gap when the cooking utensil is supporting the cover therebetween the first and second positions.

13. A cooking utensil for use with a cooking appliance having a cooking surface, and a hingedly mounted cover for selectively covering the cooking surface, the cooking utensil comprising:
a shaft having a first, and opposite second end, and wherein the shaft has an intermediate portion located between the first and second ends, and wherein the intermediate portion is defined by a plurality of first and second courses, and wherein the respective first and second courses define individual steps;
a food engaging portion mounted on the first end of the shaft and which further defines a region which cooperates with a sidewall which defines, at least in part, a cooking appliance which has a cooking surface; and
a handle mounted on the second end of the shaft, and wherein the respective steps of the shaft selectively orient a hingedly mounted cover of the cooking appliance in spaced relation relative to the cooking surface while the cooking utensil is not in use.

14. A cooking utensil as claimed in claim 13, and wherein the handle is oriented along a given line of reference, and wherein the plurality of first courses as defined by the intermediate portion of the shaft are oriented in a substantially parallel and laterally offset relation relative to the line of reference.

15. A cooking utensil as claimed in claim 14, and wherein the plurality of second courses are individually positioned therebetween the respective first courses, and wherein the respective second courses are individually oriented in an angulated orientation relative to the line of reference.

16. A cooking utensil as claimed in claim 15, and wherein the plurality of steps are substantially equally spaced apart.

17. A cooking utensil as claimed in claim 13, and wherein the sidewall is positioned adjacent to the cooking surface, and wherein the region of the food engaging portion engages the sidewall of the cooking appliance.

18. A cooking utensil as claimed in claim 17, and wherein the food engaging portion is a spatula having a main body which has a line of reference, and wherein the first end of the shaft is mounted on the spatula at a location which is disposed in laterally offset relation relative to the line of reference.

19. A cooking utensil as claimed in claim 17, and wherein the region of the food engaging portion for engaging the sidewall of the cooking appliance defines a channel which matingly receives a portion of the sidewall.

20. A cooking utensil as claimed in claim 17, and wherein the food engaging portion comprises a fork having a plurality of tines.

21. A cooking utensil for use with a cooking appliance comprising:
a food engagement portion which defines a channel which matingly receives a portion of a sidewall of a cooking appliance which has a hingedly mounted cover and which is moveable between a first and second position; and
an elongated shaft having a first end which is mounted on the food engagement portion, and an opposite second end which defines a handle, and wherein the elongated shaft defines a plurality of steps the therebetween the first and second ends of the shaft, and wherein the cooking utensil is operable to support the cover of the cooking appliance in a plurality of substantially fixed orientations therebetween the first and second position of the cover when the food engagement portion engages the sidewall of the cooking appliance, and the cover is disposed in gravitationally rested relation on one of the plurality of steps.

22. A cooking utensil as claimed in claim 21, and wherein the food engagement portion is a spatula.

23. A cooking utensil as claimed in claim 21, and wherein the food engagement portion is a fork defined by a plurality of tines.

24. A cooking utensil as claimed in claim 21, and wherein the plurality of steps are equally spaced apart.

25. A cooking utensil as claimed in claim 21, and wherein the elongated shaft is substantially linear.

26. A cooking utensil as claimed in claim 21, and wherein the elongated shaft is nonlinear.

27. A cooking utensil as claimed in claim 21, and wherein the steps are positioned laterally outwardly relative to a longitudinal line of reference.

28. A cooking utensil for use with a cooking appliance with a hingedly mounted cover, comprising:

a food engaging portion defining a channel which matingly cooperates with a peripheral edge of a generally vertically oriented sidewall of a cooking appliance which defines a cooking surface, and wherein the cooking appliance has a hingedly mounted cover which selectively covers the cooking surface; and a shaft having a first end affixed to the food engaging portion, and an opposite second end which has a handle affixed thereto, and wherein the shaft has an intermediate portion located between the first and second ends, and which includes a plurality of angulated courses which define discreet steps which are located at predetermined locations therebetween the first and second ends, and wherein the discreet steps are operable to engage and support the hingedly mounted cover in spaced relation relative to the cooking surface when the cooking utensil is not being employed to cook food.

* * * * *

UNITED STATES PATENT AND TRADEMARK OFFICE
CERTIFICATE OF CORRECTION

| | |
|---|---|
| PATENT NO. | : 7,399,016 B2 |
| APPLICATION NO. | : 11/023718 |
| DATED | : July 15, 2008 |
| INVENTOR(S) | : William E. Barker and Donald W. Hensley |

It is certified that error appears in the above-identified patent and that said Letters Patent is hereby corrected as shown below:

Column 2, line 28 (Fig. 1), replace "operation of the" with --operation of the present invention.--.

Column 8, line 42 (Claim 21), replace "plurality of steps the therebetween" with --plurality of steps therebetween--.

Signed and Sealed this

Seventh Day of October, 2008

JON W. DUDAS
*Director of the United States Patent and Trademark Office*